US005691626A

United States Patent [19]
Esser et al.

[11] Patent Number: 5,691,626
[45] Date of Patent: Nov. 25, 1997

[54] ACTIVE DAMPING CONTROL FOR ACTIVE POWER FILTER

[75] Inventors: Albert Andreas Maria Esser, Niskayuna; Paul Michael Szczesny, Clifton Park; Jeffrey Joseph Nasadoski, Gloversville, all of N.Y.; Robert Joseph Bastian, Madison, Conn.; Peter Claudius Sanza, Niskayuna, N.Y.

[73] Assignee: General Electric Company, Schenectady, N.Y.

[21] Appl. No.: 474,212

[22] Filed: Jun. 7, 1995

[51] Int. Cl.$^6$ .................................. G05F 3/00; G05F 1/70
[52] U.S. Cl. ........................................ 323/205; 323/209
[58] Field of Search .................................. 323/205, 206, 323/207, 208, 209, 210, 211

[56] References Cited

U.S. PATENT DOCUMENTS

| | | | |
|---|---|---|---|
| 3,882,361 | 5/1975 | Hinman, Jr. | 317/27 R |
| 4,228,492 | 10/1980 | Hausler et al. | |
| 5,159,540 | 10/1992 | Lee. | |
| 5,162,983 | 11/1992 | Kumagai | 363/39 |
| 5,321,598 | 6/1994 | Moran | 363/41 |
| 5,323,330 | 6/1994 | Asplund et al. | 364/492 |
| 5,384,696 | 1/1995 | Moran et al. | 363/40 |
| 5,465,203 | 11/1995 | Bhattacharya et al. | 363/40 |
| 5,526,252 | 6/1996 | Erdman | 363/41 |
| 5,530,396 | 6/1996 | Vlatkovic et al. | |

OTHER PUBLICATIONS

Adel S. Sedra, and Kenneth C. Smith, Microelectronic Circuits, 2nd edition, p. 8. "Filters", 1987.

*Primary Examiner*—Peter S. Wong
*Assistant Examiner*—Bao Q. Vu
*Attorney, Agent, or Firm*—Ann M. Agosti; Marvin Snyder

[57] ABSTRACT

An active damping control device for an active power filter includes a filter circuit having an inductor and a capacitor for suppressing noise in the active power filter; a first current sensor for sensing a three phase capacitor current of the filter capacitor; a second current sensor for detecting a three phase load current; and an active power filter controller for extracting the fundamentals of the capacitor and load currents and calculating a reference current for the active power filter. The active power filter controller can include a phase locked loop device or a notch filter for receiving a grid voltage and providing a corresponding voltage angle; first and second discrete fourier transform devices for using the voltage angle and the capacitor and load currents for extracting the fundamentals of the capacitor and load currents, respectively, and providing respective first and second output currents; and a subtractor for subtracting the first output current from the second output current to obtain the reference current. The active power filter can further include, situated between the first discrete fourier transform device and the subtractor, a multiplier for multiplying the first output current by a predetermined factor and a high pass filter for filtering the first output current. The filter circuit can include a circuit breaker coupling the inductor, the capacitor, and the first current sensor to the load for providing overcurrent protection to the filter circuit.

15 Claims, 4 Drawing Sheets

ACTIVE DAMPING CONTROL FOR ACTIVE POWER FILTER

BACKGROUND OF THE INVENTION

1. Field of the Invention

The present invention relates generally to active power filters and more particularly to active damping controls for active power filters.

2. Description of the Related Art

In conventional active power filter systems, an active power filter controller measures load current and grid voltage. The controller calculates and filters the fundamental component of the load current which is then subtracted from an instantaneous measured current. The resulting value is used as a reference value for the active power filter. Such a system remains stable only if the sensed load current results from resisters or inductors such as linear or non-linear type thyristor converters. If a capacitive load is present, such as a Var-compensation (volt-ampere) load which draws current but does not produce real power, the system becomes unstable because harmonic currents as great as 100 times higher than the fundamental 60 Hz can be caused. Therefore, the current of each capacitive load is measured and must be separately processed.

Kumagai, U.S. Pat. No. 5,162,983 describes a system wherein a load capacitor current is sensed and then subtracted from the load current, thus creating a differential current signal upon which the active power filter acts. The current transformer in Kumagai is positioned beyond the loads and therefore cannot be situated in a common housing with the filter controls. Furthermore, if more than one capacitative load is present, a separate sensor would be required for each capacitive load.

SUMMARY OF THE INVENTION

It would be advantageous to have a damping control for an active power filter that requires only one sensor regardless of the number of capacitive loads and that can, if desired, be situated in a common housing with filter controls.

Briefly, according to an embodiment of the invention, an active damping control device for an active power filter comprises a filter circuit including an inductor and a capacitor for suppressing noise in the active power filter; a first current sensor for sensing a three phase capacitor current of the filter capacitor; a second current sensor for detecting a three phase load current; and an active power filter controller for extracting the fundamentals of the capacitor and load currents and calculating a reference current for the active power filter. The active power filter controller can include a phase locked loop device or notch filter for receiving a grid voltage and providing a voltage angle; a first discrete fourier transform device for using the voltage angle and the capacitor current for extracting the fundamental of the capacitor current and providing a first output current; a second discrete fourier transform device for using the voltage angle and the load current for extracting the fundamental of the load current and providing a second output current; and a subtractor for subtracting the first output current from the second output current to obtain the reference current. The active power filter can further include a multiplier for multiplying the output current by a predetermined factor and a high pass filter for filtering the output current.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
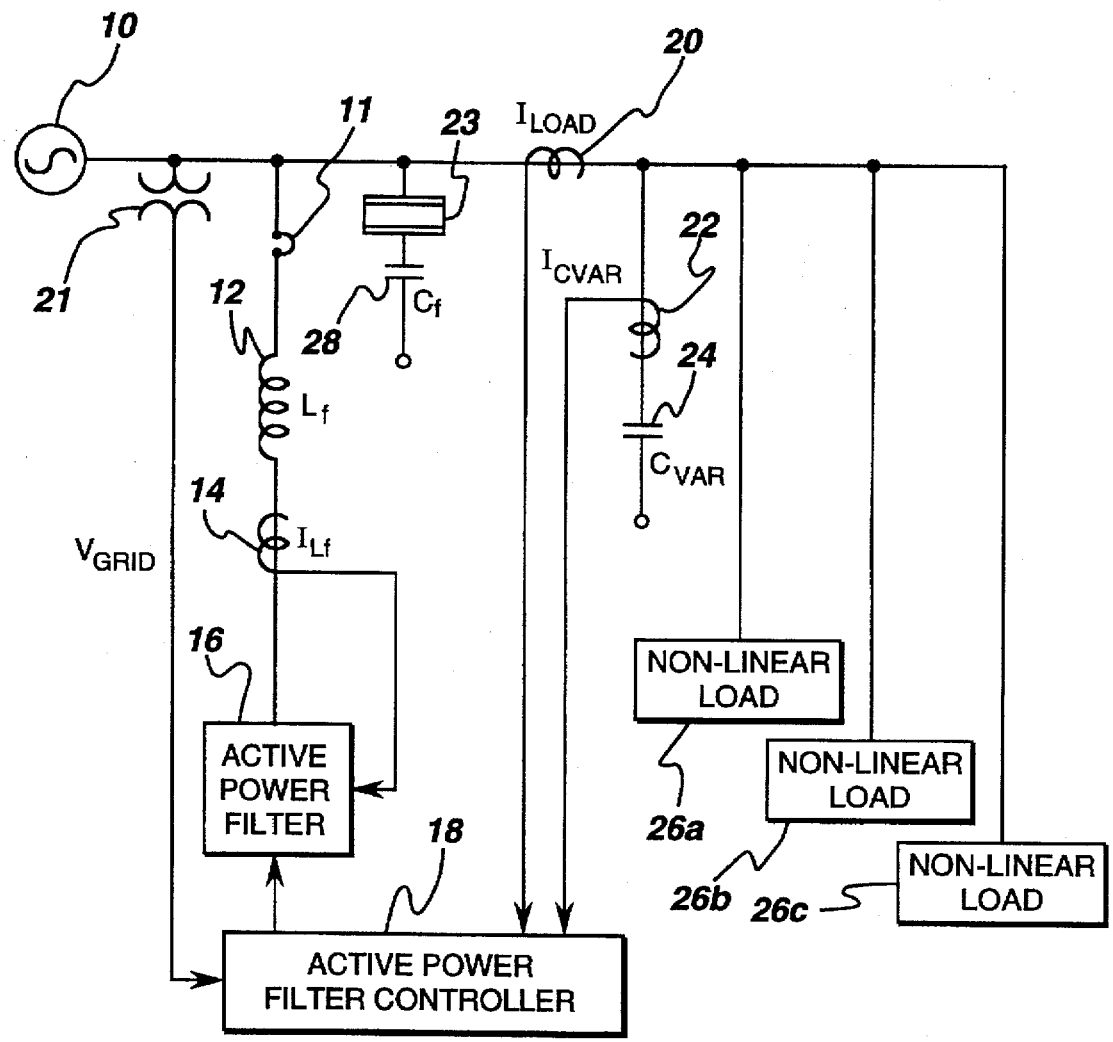
FIG. 1 is a circuit diagram of an active power filter system.

FIG. 1 is a circuit diagram of an active power filter system usable in a power distribution system including a power source 10 and a collection of non-linear loads 26a, 26b, and 26c. An active power filter controller 18 evaluates the grid voltage $V_{Grid}$ and the load current $I_{Load}$ of several non-linear loads 26a, 26b, and 26c. The load current $I_{Load}$ can be measured with a load current sensor 20, and the grid voltage $V_{Grid}$ can be measured with a voltage sensor 21. Within the controller the fundamental component of the load current is calculated and filtered. This filtered fundamental current is subtracted from the instantaneous measured current $I_{Load}$. The result is used as the reference value for an active power filter 16 (which is typically coupled to a filter inductance 12) and generated as filter current $I_{Lf}$. Filter current $I_{Lf}$ can be sensed using filter current sensor 14. If a capacitive load $C_{Var}$ 24 is present, the system becomes unstable unless the current $I_{CVar}$ of each capacitive load is measured with a capacitive current sensor 22 and separately processed. Protective devices such as circuit breaker 11 and fuse 23 are typically used to provide overcurrent protection.

Figure 2:
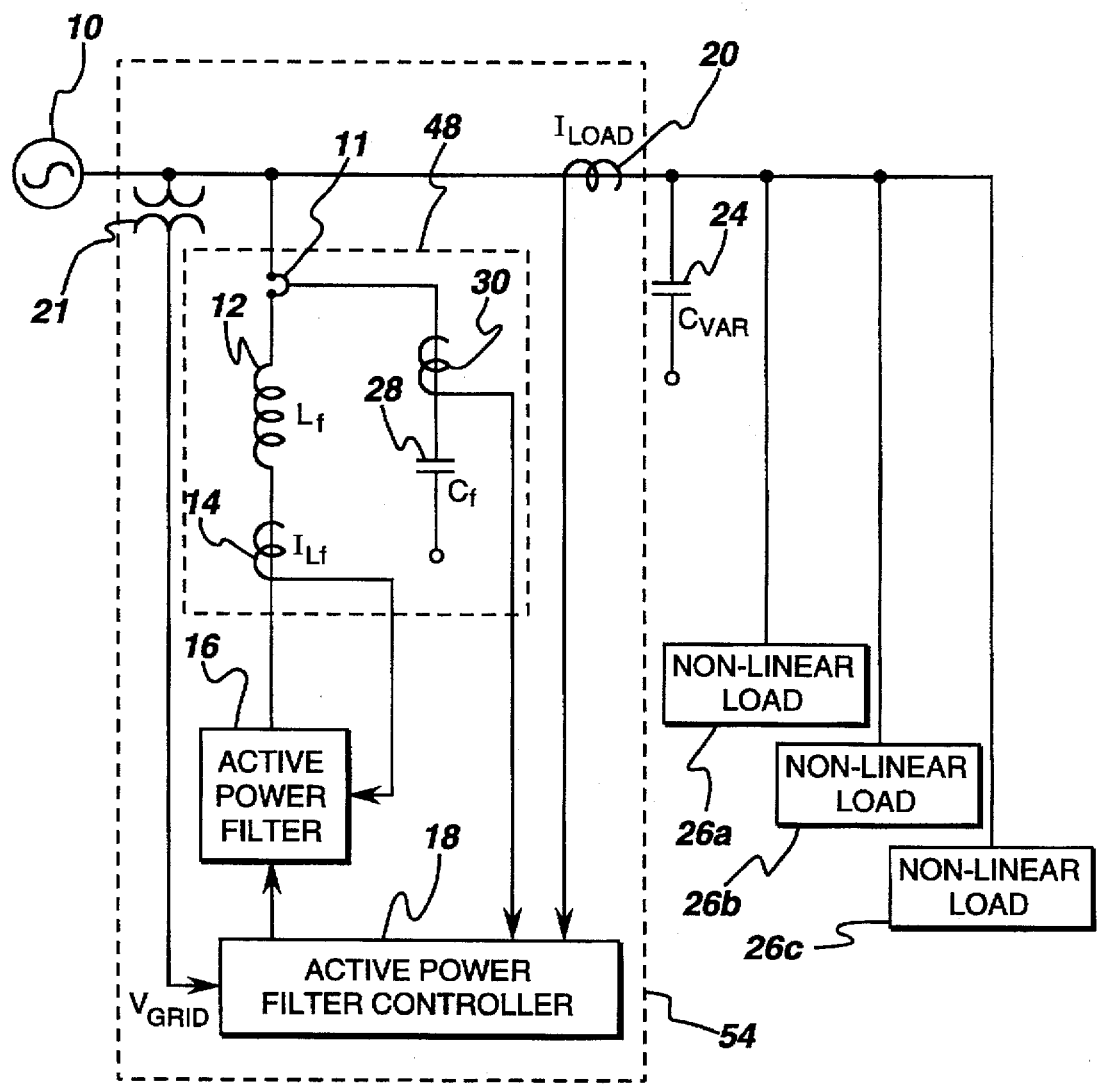
FIG. 2 is a circuit diagram of an active power filter system of the present invention.

FIG. 2 is a circuit diagram of an active power filter system of the present invention. The active power filter 16 and controller 18 are coupled to the system through a filter circuit 48 comprising, for example, an inductor $L_f$ 12 and a filter capacitor $C_f$ 28 to suppress noise in the active power filter. A phase current sensor system 30 measures the three phase capacitor current $I_{Cf}$ for use in the controller. In the present invention, as described below, $I_{Cf}$ is acted on independently to extract the fundamental such that the remaining signal comprises the higher frequency components that exist in the capacitor current. This signal is then the basis for creating current commands to the active power filter that will actively damp the offending high frequency components by injecting the matching current of opposite phase.

In this embodiment, if desired, current sensor 30 can be positioned with the active power filter and the active power filter controller in a common housing 54. Furthermore, only one capacitive current sensor set is needed, regardless of the number of capacitive loads. The capacitor current sensor scheme is also useful because it filters the harmonics of the active power filter itself. Furthermore, the capacitor current signal can also be used in the active filter control to detect a filter overcurrent and send an overcurrent signal to an active power filter main protective device 11, thereby eliminating the need for a separate overcurrent protective device 23 (shown in FIG. 1) for the filter capacitor.

Figure 3:
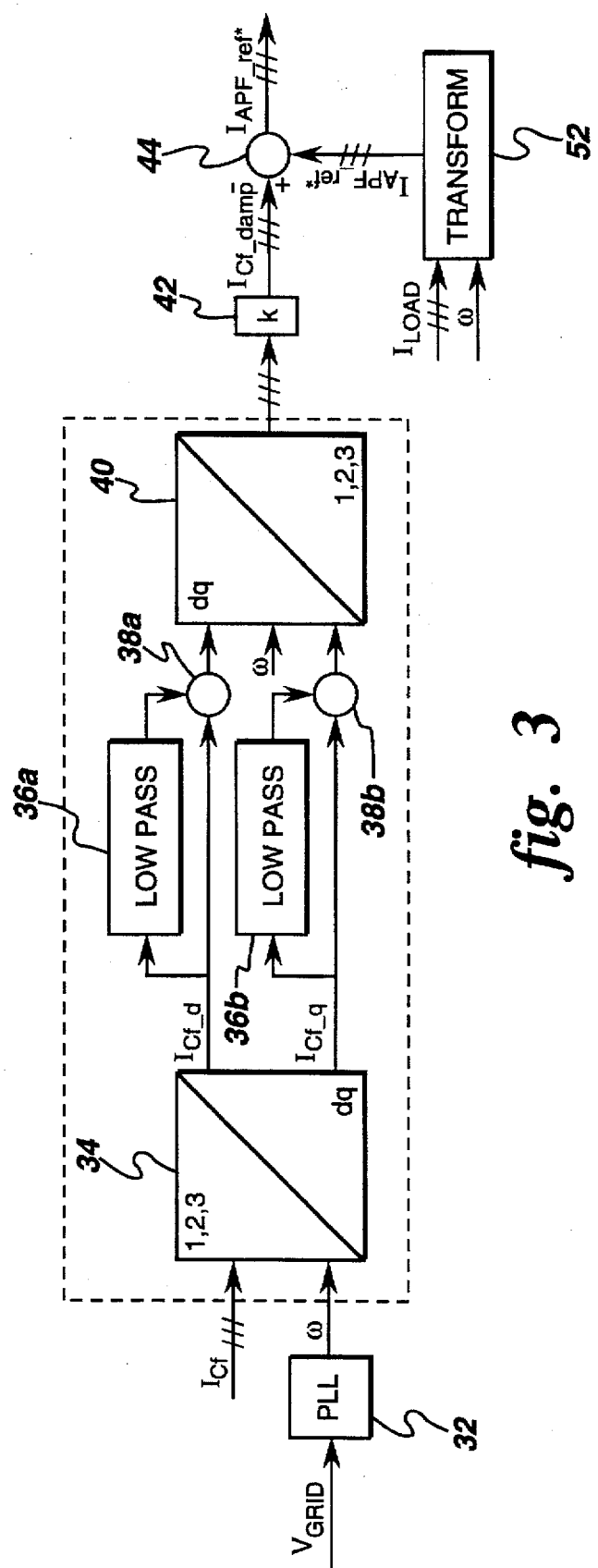
FIG. 3 is a circuit diagram of an embodiment of signal processing for the active power filter system of FIG. 2.

FIG. 3 is a circuit diagram of an embodiment of signal processing for the active power filter system of FIG. 2. The three phase capacitor current $I_{Cf}$ is transformed into a stationary reference frame using, for example, a conventional dq transformation device 34. The three phase current is supplied to the dq transformation device with an angle ω which can be derived from a voltage processing device, shown as PLL (Phased Lock Loop) 32, which processes the grid voltage $V_{Grid}$. A notch filter (not shown) is another example of a device which can be used to provide a voltage template (and thus a voltage angle) by processing the grid voltage. The dq transformation device creates two transformed current signals ($I_{Cf\_d}$ and $I_{Cf\_q}$) representative of real and reactive power which are a dc current representing the fundamental component (e.g. 60 Hz) and an ac current representing the harmonic distortion. Because only the harmonic distortion is to be corrected, low pass filters 36a and 36b are used to create filtered current signals which establish the fundamental references. In one embodiment the low pass filters are designed to pass signals having frequencies less than or equal to about 60 Hz, for example. The filtered current signals are subtracted using subtractors 38a and 38b from the respective transformed current signals to calculate differential current signals representative of harmonic distortions. The d and q components are then transformed back into a three phase system through a inverse dq transformation device 40 which provides a first output current $I_{Cf\_damp}$. The elements 34, 36a and 36b, 38a and 38b, and 40, which act as a discrete fourier transformation device 50 in this embodiment, either can include physical electronic devices or can exist and be implemented within a computer program.

The current in filter capacitor 28 has the same phase as the current in the Var-compensator 24 ($C_{Var}$), but the amplitudes are typically different. A multiplier 42 having the factor k can be used to adjust the output current $I_{Cf\_damp}$ to the desired value.

The output current $I_{Cf\_damp}$ is then subtracted by subtractor 44 from the command current $I_{APF\_ref}$ (a second output current generated by controller 18). The command current $I_{APF\_ref}$ is generated by a similar process as the output current $I_{Cf\_damp}$ with a similar discrete fourier transform device 52 (a second discrete transform device) except that the input three phase current signal is $I_{Load}$ instead of $I_{Cf}$. The result of the subtraction of $I_{Cf\_damp}$ from $I_{APF\_ref}$ is sent to active power filter 16 as the reference value for the current $I_{APF\_ref}^*$.

Figure 4:
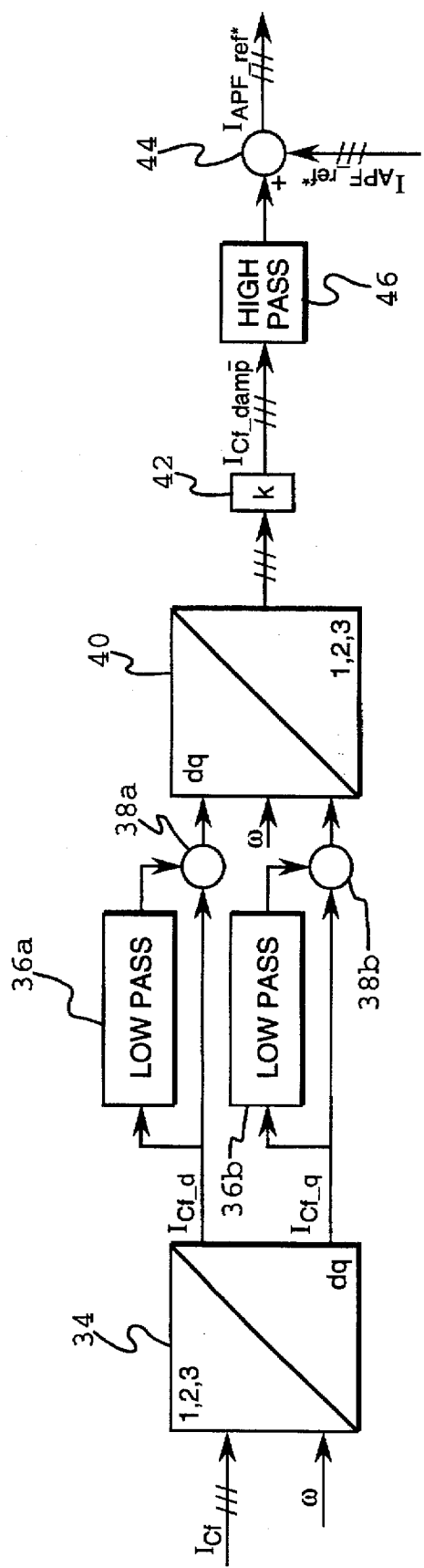
FIG. 4 is a circuit diagram of another embodiment of signal processing for the active power filter system of FIG. 2.

The transformation of $I_{Cf}$ is especially useful in reducing noise of higher order harmonics. FIG. 4 is a circuit diagram of another embodiment of signal processing for the active power filter system of FIG. 2 in which a high pass filter 46 corrects the system behavior for lower order harmonics. In one embodiment the high pass filter is designed to pass signals having frequencies greater than or equal to about 600 Hz, for example.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An active damping control device for an active power filter, the device comprising:

a filter circuit comprising an inductor and a capacitor for suppressing noise in the active power filter, and a first current sensor system for sensing a three phase capacitor current of the capacitor;

a second current sensor system for detecting a three phase load current;

an active power filter controller for extracting the fundamentals of the capacitor and load currents and calculating a reference current for the active power filter to dampen high frequency components of the active power filter.

2. The device of claim 1, wherein the active power filter controller comprises:

a voltage processing device for receiving a grid voltage and providing a corresponding voltage angle;

a first discrete fourier transform device for using the voltage angle and the capacitor current for extracting the fundamental of the capacitor current and providing a first output current;

a second discrete fourier transform device for using the voltage angle and the load current for extracting the fundamental of the load current and providing a second output current; and a subtractor for subtracting the first output current from the second output current to obtain the reference current.

3. The device of claim 2, wherein each of the first and second fourier transform devices comprises:

a first transformation device for transforming a three phase current into a stationary reference frame and providing two transformed current signals representative of real and reactive power;

two low pass filters for filtering the high frequency components of the transformed current signals and obtaining filtered current signals;

two filter subtractors, each for subtracting a respective filtered current signal from a respective transformed current signal to obtain a respective differential current signal; and a second transformation device for transforming the differential current signals to a three phase output current.

4. The device of claim 1, wherein the active power filter controller comprises:

a voltage processing device for receiving a grid voltage and providing a corresponding voltage angle;

a first discrete fourier transform device for using the voltage angle and the capacitor current for extracting the fundamental of the capacitor current and providing a first output current;

a second discrete fourier transform device for using the voltage angle and the load current for extracting the fundamental of the load current and providing a second output current; and a multiplier for multiplying the first output current by a predetermined factor;

a subtractor for subtracting the multiplied first output current from the second output current to obtain the reference current.

5. The device of claim 1, wherein the active power filter controller comprises:

a voltage processing device for receiving a grid voltage and providing a corresponding voltage angle;

a first discrete fourier transform device for using the voltage angle and the capacitor current for extracting the fundamental of the capacitor current and providing a first output current;

a second discrete fourier transform device for using the voltage angle and the load current for extracting the fundamental of the load current and providing a second output current; and a high pass filter for filtering the first output current;

a subtractor for subtracting the filtered first output current from the second output current to obtain the reference current.

6. The device of claim 1, wherein the filter circuit further includes an overcurrent protective device coupling the inductor and the capacitor to the filter circuit.

7. An active power filter system comprising:

an active power filter; and an active damping control device comprising:

a filter circuit comprising an inductor and a capacitor for suppressing noise in the active power filter;

a first current sensor for sensing a capacitor current of the capacitor;

a second current sensor for detecting a load current;

an active power filter controller for calculating a reference current for the active power filter to dampen high frequency components of the active power filter, the active power filter controller including:

a voltage processing device for receiving a grid voltage and calculating a corresponding voltage angle;

first and second transform systems, each of the first and second transform systems for extracting the respective fundamentals of the capacitor and load currents, each of the first and second transform systems including a first transformation device for transforming a three phase current into a stationary reference frame using the voltage angle and providing two transformed current signals representative of real and reactive power;

two low pass filters for filtering the high frequency components of the transformed current signals and providing filtered current signals;

two filter subtractors for subtracting a respective filtered current signal from a respective transformed current signal to obtain a respective differential current signal; and a second transformation device for transforming the differential current signals to a three phase output current; and a subtractor for subtracting an output current of the first transform system from an output current of the second transform system.

8. The system of claim 7, further including a multiplier for multiplying the output current of the first transform system, the subtractor being adapted to subtract the multiplied output current of the first transform system from the output current of the second transform system.

9. The system of claim 8, further including a high pass filter for filtering the output current of the first transform system, the subtractor being adapted to subtract the filtered output current of the first transform system from the output current of the second transform system.

10. The system of claim 7, further including a housing surrounding the active power filter and the active damping control device.

11. A method for providing active damping control for an active power filter including a filter circuit comprising an inductor and a capacitor, the method comprising the steps of:

sensing a capacitor current of the filter circuit;

sensing a load current;

extracting the fundamentals of the capacitor and load currents; and calculating a reference current for the active power filter to dampen high frequency components of the active power filter.

12. The method of claim 11, wherein extracting the fundamentals of the capacitor and load currents comprises:

measuring a grid voltage;

obtaining a voltage angle from the grid voltage;

applying a first discrete fourier transform device using the voltage angle and the capacitor current to extract the fundamental of the capacitor current and provide a first output current;

applying a second discrete fourier transform device using the voltage angle and the load current to extract the fundamental of the load current and provide a second output current.

13. The method of claim 12, further including multiplying the first output current by a predetermined factor, and wherein the step of calculating the reference current comprises subtracting the multiplied first output current from the second output current.

14. The method of claim 12, further including filtering the first output current, and wherein the step of calculating the reference current comprises subtracting the filtered first output current from the second output current.

15. The method of claim 12, wherein each of the steps of applying first and second fourier transform devices comprises:

transforming a three phase current into a stationary reference frame and providing two transformed current signals representative of real and reactive power;

filtering the high frequency components of the transformed current signals to provide filtered current signals;

subtracting each respective filtered current signal from a respective transformed current signal to obtain a respective differential current signal;

transforming the differential current signals to a three phase output current; and wherein the step of calculating the reference current comprises subtracting the output current of the first fourier transform device from the output current of the second fourier transform device.

\* \* \* \* \*